(12) United States Patent
Shin

(10) Patent No.: US 11,945,304 B2
(45) Date of Patent: Apr. 2, 2024

(54) MULTIFUNCTIONAL SWITCH SYSTEM FOR AUTONOMOUS VEHICLE AND OPERATING METHOD THEREOF

(71) Applicants: Hyundai Motor Company, Seoul (KR); Kia Motors Corporation, Seoul (KR)

(72) Inventor: Sang Hoon Shin, Hwaseong-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 543 days.

(21) Appl. No.: 17/190,273

(22) Filed: Mar. 2, 2021

(65) Prior Publication Data

US 2022/0063403 A1 Mar. 3, 2022

(30) Foreign Application Priority Data

Aug. 26, 2020 (KR) ........................ 10-2020-0108125

(51) Int. Cl.
*B60K 35/00* (2006.01)
*B60K 35/10* (2024.01)
(Continued)

(52) U.S. Cl.
CPC ............ *B60K 35/00* (2013.01); *B60N 2/5678* (2013.01); *B62D 1/06* (2013.01); *B60K 35/10* (2024.01);
(Continued)

(58) Field of Classification Search
CPC ................... B60K 35/00; B60K 37/06; B60K 2370/1438; B60K 2370/152;
(Continued)

(56) References Cited

U.S. PATENT DOCUMENTS 10,852,862 B2 12/2020 Shin
2011/0263293 A1* 10/2011 Blake ..................... B60K 37/06
455/557

(Continued)

FOREIGN PATENT DOCUMENTS

KR 10-2020-0013158 A 2/2020

OTHER PUBLICATIONS

Williams et al, K. Towards Leveraging the Driver's Mobile Device for an Intelligent, Sociable In-Car Robotic Assistant, Google Scholar, 2013 IEEE Intelligent Vehicles Symposium (IV), Jun. 2013, pp. 369-376. (Year: 2013).*

(Continued)

*Primary Examiner* — Russell Frejd
(74) *Attorney, Agent, or Firm* — MORGAN, LEWIS & BOCKIUS LLP

(57) ABSTRACT

A multifunctional switch system for an autonomous vehicle may include a plurality of docking stations in the interior of the autonomous vehicle, sets an operation mode of a mobile operation device for each of positions of the plurality of docking stations, and operates in an operation mode corresponding to the position of the docking station as the mobile operation device is docked to the docking station to enable a driver in the autonomous vehicle to conveniently operate various convenience devices regardless of the driver's location, and an operating method thereof.

20 Claims, 13 Drawing Sheets

(51) Int. Cl.
*B60K 35/22* (2024.01)
*B60K 35/50* (2024.01)
*B60K 35/60* (2024.01)
*B60N 2/56* (2006.01)
*B62D 1/06* (2006.01)

(52) U.S. Cl.
CPC .............. *B60K 35/22* (2024.01); *B60K 35/50* (2024.01); *B60K 35/60* (2024.01); *B60K 2360/1438* (2024.01); *B60K 2360/794* (2024.01); *B60K 2360/834* (2024.01)

(58) Field of Classification Search
CPC ........ B60K 2370/794; B60K 2370/834; B60K 2370/137; B60K 2370/1446; B60K 2370/573; B60K 2370/175; B60N 2/5678; B60N 2/0228; B62D 1/06; B60R 16/02; B60R 16/023; B60R 16/037; B60W 60/0013; B60W 50/14; B60W 2050/009; B60W 2050/146; B60W 2556/45; G05D 1/0225
See application file for complete search history.

(56) References Cited

U.S. PATENT DOCUMENTS

| | | | |
|---|---|---|---|
| 2014/0232500 A1* | 8/2014 | Alexander | B60R 11/00 335/306 |
| 2015/0025917 A1* | 1/2015 | Stempora | G02B 27/0093 705/4 |
| 2020/0026370 A1 | 1/2020 | Shin | |

OTHER PUBLICATIONS

Williams et al, K. Affective Robot Influence on Driver Adherence to Safety, Cognitive Load Reduction and Sociability, Google Scholar, Proceedings of the 6th International Conference on Automotive User Interfaces and Interactive Vehicular Applications, Sep. 2014, pp. 1-8. (Year: 2014).*

* cited by examiner

MULTIFUNCTIONAL SWITCH SYSTEM FOR AUTONOMOUS VEHICLE AND OPERATING METHOD THEREOF

CROSS-REFERENCE TO RELATED APPLICATION

The present application claims priority to Korean Patent Application No. 10-2020-0108125, filed on Aug. 26, 2020, the entire contents of which is incorporated herein for all purposes by this reference.

BACKGROUND OF THE INVENTION

Field of the Invention

The present invention relates to a multifunctional switch system applied to an autonomous vehicle and an operating method thereof.

Description of Related Art

A vehicle is provided with various convenience devices and switches for operating the various convenience devices. For example, the switches includes a door lock/unlock switch capable of collectively locking each door of a vehicle or unlocking the lock, a mirror angle adjustment switch for facilitating a driver to adjust a mirror angle which is suitable for the driver, a mirror folding switch for facilitating the driver to fold a side mirror, an Integrated Memory System (IMS) switch in which the height, position, and backrest angle of the driver's seat that are suitable for the driver are recoded, a seat heating switch, a seat ventilation switch, a steering wheel heating switch, and an air conditioning (air conditioner and heater) switch, an indoor light switch, and the like.

Each of these switches is a component of an individually designed system, and the number of these switches is too large for the driver who utilizes them, so it may be difficult for the driver to operate the switches, and it is necessary for the manufacturer to manufacture all of the switches, which eventually increases the price of the vehicle.

A vehicle with level 4 of autonomous driving in which the driver is able to intervene under certain conditions such as bad weather, when a driver is located in a rear seat instead of a driver seat, or when the driver rotates the driver seat to face the rear of the vehicle, there is inconvenience in operating various conveniences devices because the driver cannot reach buttons for operating the conveniences devices.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a multifunctional switch system for an autonomous vehicle which includes a plurality of docking stations in the interior of the autonomous vehicle, sets an operation mode of a mobile operation device configured for each of positions of the plurality of docking stations, and operates in an operation mode corresponding to the position of the docking station as the mobile operation device is docked to the docking station to enable a driver in the autonomous vehicle to conveniently operate various convenience devices regardless of the driver's location, and an operating method thereof.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a mobile operation device configured for an autonomous vehicle may include a magnetic force generator that generates a magnetic force for docking to a plurality of docking stations provided in an interior of the autonomous vehicle, a touch screen that displays various operation buttons, and a controller that is configured to control the touch screen to display an operation button corresponding to a position of a docking station among the plurality of operation buttons when the mobile operation device is docked to any one of the plurality of docking stations, and process a user's input through the operation button.

The controller may be configured to control the touch screen to display at least one of a door operation button, a mirror operation button, and a seat operation button among the plurality of operation buttons when the mobile operation device is docked to a docking station provided in a door trim in the autonomous vehicle.

The controller may be configured to determine priorities among the door operation button, the mirror operation button and the seat operation button based on state information related to the autonomous vehicle.

The controller may be configured to control the touch screen to display one of a seat heating-wire operation button, a seat ventilation operation button, and a steering wheel heating-wire operation button based on state information related to the autonomous vehicle when the mobile operation device is docked to a docking station provided in a console base in the autonomous vehicle.

The controller may select the seat heating-wire operation button when an outdoor temperature is less than a first reference value, and select the seat ventilation operation button when the outdoor temperature is greater than a second reference value which is greater than the first reference value.

The controller may be configured to control the touch screen to display one of an air conditioning operation button and an indoor light operation button based on state information related to the autonomous vehicle when the mobile operation device is docked to a docking station provided in a rear seat in the autonomous vehicle.

The controller may select the air conditioning operation button when a difference between an outdoor temperature and an indoor temperature of the vehicle is greater than a reference value.

The controller may be configured to control the touch screen to display one of a window operation button, a seat operation button, and vehicle state notification information based on state information related to the autonomous vehicle when the mobile operation device is in inside of the autonomous vehicle while not being docked to any of the plurality of docking stations.

The controller may be configured to control the touch screen to display a door operation button when the mobile operation device is outside the autonomous vehicle while not being docked to any of the plurality of docking stations.

According to various aspects of the present invention, an operating method of a mobile operation device configured for an autonomous vehicle may include detecting, by a controller, a docking to any one of a plurality of docking stations provided in an interior of the autonomous vehicle, determining, by the controller, an operation button corresponding to the docking station, displaying, by a touch screen, the determined operation button, and processing, by the controller, an input of a user through the determined operation button.

The determining of the operation button may include selecting at least one of a door operation button, a mirror operation button, and a seat operation button when being docked to a docking station provided in a door trim in the autonomous vehicle.

The selecting of at least one of the door operation button, the mirror operation button, and the seat operation button may include determining priorities among the door operation button, the mirror operation button and the seat operation button based on state information related to the autonomous vehicle.

The determining of the operation button may include selecting one of a seat heating-wire operation button, a seat ventilation operation button, and a steering wheel heating-wire operation button based on state information related to the autonomous vehicle when being docked to a docking station provided in a console base in the autonomous vehicle.

The selecting of one of the seat heating-wire operation button, the seat ventilation operation button, and the steering wheel heating-wire operation button may include selecting the seat heating-wire operation button when an outdoor temperature is less than a first reference value and selecting the seat ventilation operation button when the outdoor temperature is greater than a second reference value which is greater than the first reference value.

The determining of the operation button may include selecting one of an air conditioning operation button and an indoor light operation button based on state information related to the autonomous vehicle when being docked to a docking station provided in a rear seat in the autonomous vehicle.

The selecting of one of the air conditioning operation button and the indoor light operation button may include selecting the air conditioning operation button when a difference between an outdoor temperature and an indoor temperature of the vehicle is greater than a reference value.

The determining of the operation button may include selecting one of a window operation button, a seat operation button, and vehicle state notification information based on state information related to the autonomous vehicle when the mobile operation device is in inside of the autonomous vehicle while not being docked to any of the plurality of docking stations.

The determining of the operation button may include selecting a door operation button when the mobile operation device is outside the autonomous vehicle while not being docked to any of the plurality of docking stations.

According to various aspects of the present invention, a multifunctional switch system for an autonomous vehicle may include a plurality of docking stations provided in an interior of the autonomous vehicle to communicate with various convenience devices provided in the autonomous vehicle, and a mobile operation device that makes a docking to one of the plurality of docking stations through a magnetic force, determines an operation button corresponding to a position of the docking station, displays the determined operation button and processes a user's input through the displayed operation button.

The docking station may guide a user to a docking zone by turning on a lamp when a strength of the magnetic force of the mobile operation device is greater than a reference value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
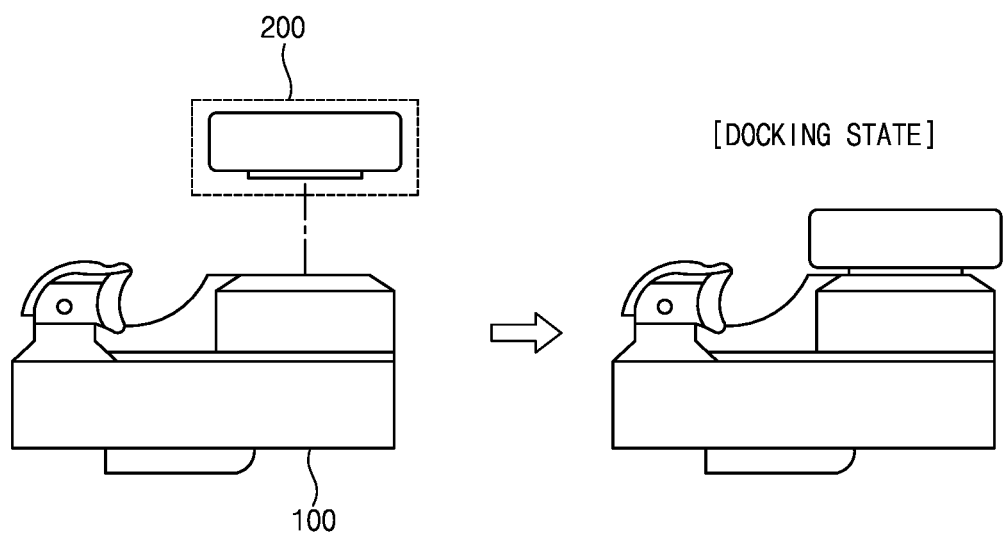
FIG. 1 is a block diagram of a multifunctional switch system for an autonomous vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram of a multifunctional switch system for an autonomous vehicle according to various exemplary embodiments of the present invention.

Referring to FIG. 1, a multifunctional switch system for an autonomous vehicle according to various exemplary embodiments of the present invention may include a docking station 100 and a mobile operation device 200.

The above components will be described below. First, the docking station 100 is a module on which the mobile operation device 200 is docked by magnetic force, and may be located inside the autonomous vehicle. For example, the docking station 100 may be located in a door trim, a console base, a rear seat, or the like.

The docking station 100 may transmit an operation signal from the mobile operation device 200 docked to the docking station 100 itself to a corresponding convenience device. In the instant case, the docking station 100 may communicate with the mobile operation device 200 through a wired/wireless communication method or a short range wireless communication method (for example, Bluetooth or Wi-Fi).

Furthermore, the docking station 100 may be connected to a vehicle network. In the instant case, vehicle networks may include a Controller Area Network (CAN), a Controller Area Network with Flexible Data-rate (CAN FD), a Local Interconnect Network (LIN), FlexRay, Media Oriented Systems Transport (MOST), and Ethernet, and the like.

Figure 2:
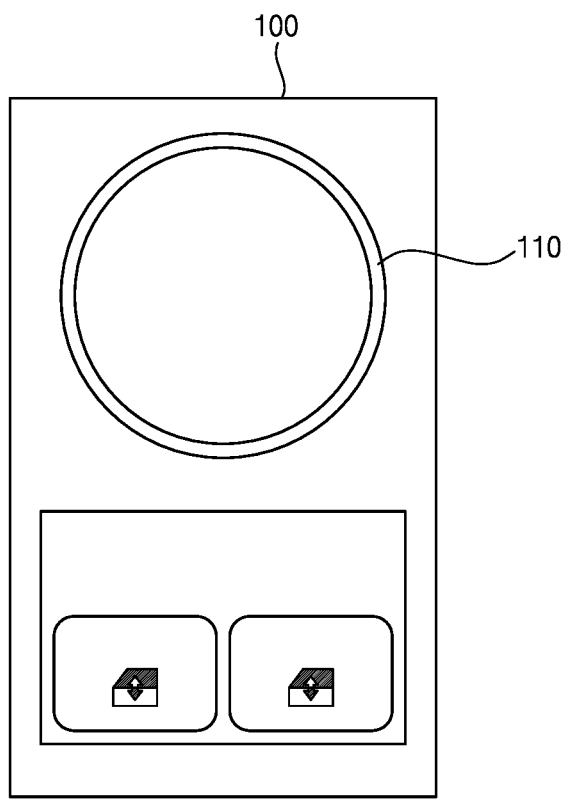
FIG. 2 is an exemplary view showing a docking zone displayed by a docking station provided in a multifunctional switch system for an autonomous vehicle according to various exemplary embodiments of the present invention.

Furthermore, the docking station 100 may detect a strength of the magnetic force of a magnetic force generator (e.g., a magnet) provided in the mobile operation device 200, and when the detected strength of the magnetic force is greater than a reference value, and guide a user to a docking zone 110 by turning on a lamp as shown in FIG. 2.

Furthermore, the docking station 100 may store unique identification information according to an installation location. The present identification information may be used for the mobile operation device 200 to determine its own operation mode.

Figure 3:
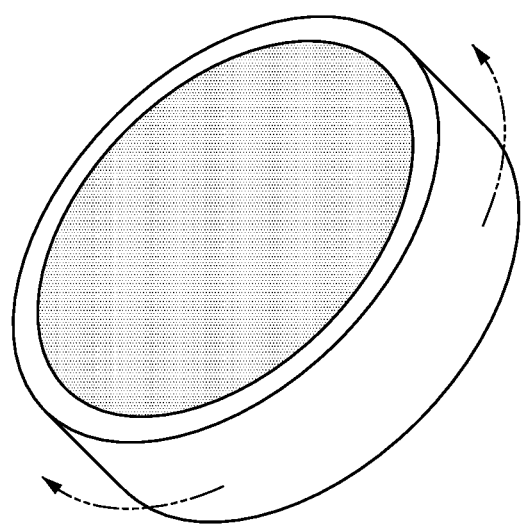
FIG. 3 is an exemplary view showing a form of a mobile operation device provided in a multifunctional switch system for an autonomous vehicle according to various exemplary embodiments of the present invention.

The mobile operation device 200 is a module that receives operation signals for various convenience devices provided in an autonomous vehicle from the user, and may be implemented in a form of a rotation dial as shown in FIG. 3, for example. In the instant case, a touch screen may be provided at the upper end portion of the rotation dial, and a magnetic force generator (e.g., a magnet) for generating a magnetic force may be provided at the lower end portion of the rotation dial.

The mobile operation device 200 may operate in an operation mode corresponding to a position of the docking station 100 when the mobile operation device 200 is docked to the docking station 100, and operate in separate and different operation modes depending on whether the position of the mobile operation device 200 is in the inside or outside of the autonomous vehicle when the mobile operation device 200 is not docked to the docking station 100.

For example, the mobile operation device 200 may operate in operation mode 1 while being docked to the docking station 100, operate in operation mode 2 when being in the inside of the autonomous vehicle while not being docked to the docking station 100, and operate in operation mode 3 when being in the outside of the autonomous vehicle while not being docked to the docking station 100. In the instant case, operation mode 1 may be classified into operation mode 1-1, operation mode 1-2, . . . , operation mode 1-$n$ depending on a position of the docking station 100 in the autonomous vehicle.

Figure 4:
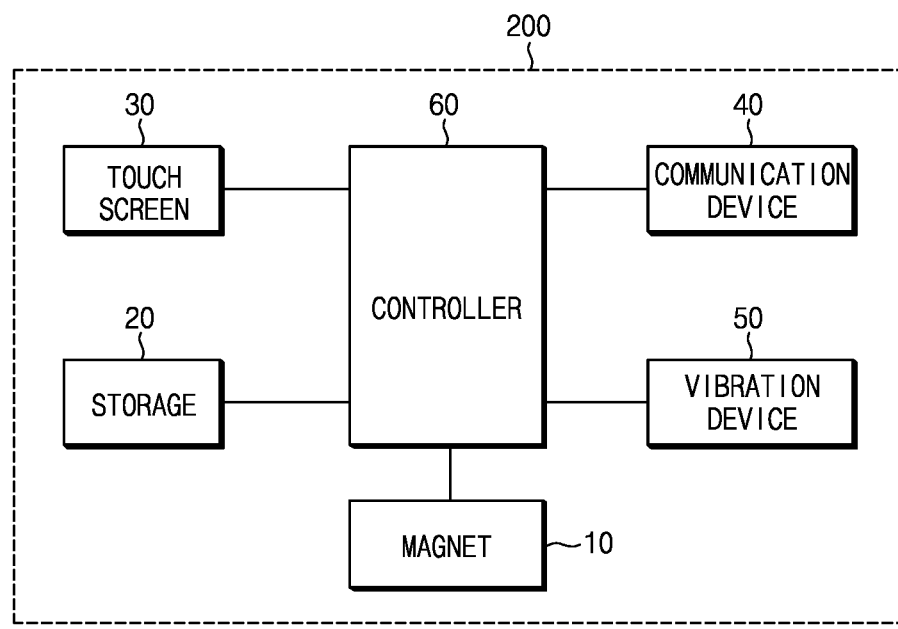
FIG. 4 is a block diagram of a mobile operation device provided in a multifunctional switch system for an autonomous vehicle according to various exemplary embodiments of the present invention.

FIG. 4 is a block diagram of a mobile operation device provided in a multifunctional switch system for an autonomous vehicle according to various exemplary embodiments of the present invention.

Referring to FIG. 4, the mobile operation device 200 provided in the multifunctional switch system for an autonomous vehicle according to various exemplary embodiments of the present invention may include a magnet 10, storage 20, a touch screen 30, a short-range communication device 40, a vibration device 50, and a controller 60. In the instant case, the components may be combined with each other as one entity, or some components may be omitted according to a method of implementing the mobile operation device 200 provided in the multifunctional switch system for an autonomous vehicle according to various exemplary embodiments of the present invention.

The above components will be described below. First, the magnet 10 is an example of a magnetic force generator and may be configured to make a docking to the docking station 100 by generating a magnetic force.

The storage 20 may store various logics, algorithms, and programs required during a process for setting an operation mode corresponding to each of positions of a plurality of docking stations provided in the autonomous vehicle, and operating in an operation mode corresponding to the position of the docking station 100 when being docked to the docking station 100.

The storage 20 may store operation mode information corresponding to identification information related to each docking station.

The storage 20 may include at least one type of storage medium of a flash memory type, a hard disk type, a micro type, and a card type (e.g., an Secure Digital Card (SD card) or an eXtream Digital card (XD card)) of memory, a Random Access Memory (RAM), a Static RAM (SRAM), a Read-Only Memory (ROM), a Programmable ROM (PROM), an Electrically Erasable PROM (EEPROM), a Magnetic Memory (MRAM), a magnetic disk, and an optical disk type of memory.

The touch screen 30 may be a touch display having a touch panel, and may display an operation button corresponding to each operation mode, and generate an operation signal corresponding to the operation button.

The communication device 40 may communicate with the docking station 100 in a wired or wireless manner. In the instant case, the communication device 40 may receive identification information from the docking station 100.

The communication device 40 may include a wireless Internet module and a short-range communication module. Here, the wireless Internet module may perform communication through Wireless LAN (WLAN), WiFi (Wireless Fidelity) Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), or the like, and the short-range communication module may support short-range communication using at least one of Bluetooth™, Radio Frequency Identification (RFID), Infrared Data Association (IrDA), UWB (Ultra Wideband), ZigBee, Near Field Communication (NFC), Wireless Universal Serial Bus (Wireless USB) technologies.

The vibration device 50 is a module that enables blind operation, and may generate different vibrations for each function.

The controller 60 may perform overall control such that the components normally perform their functions. The controller 60 may be implemented in a form of hardware or software, or may be implemented in a combination of hardware and software. The controller 60 may be implemented with a microprocessor, but is not limited thereto.

The controller 60 may perform a variety of control in a process for setting an operation mode corresponding to each of positions of a plurality of docking stations provided in the autonomous vehicle, and operating in the operation mode corresponding to the position of the docking station 100 when being docked to the docking station 100. In the instant case, the controller 60 may process an input corresponding to an operation button displayed on the touch screen 30.

The controller 60 may collect a variety of state information related to the autonomous vehicle (for example, the to open or closed state of a door, a power supply level for an electric load, a battery state, ignition, a speed, an external temperature, an indoor temperature, an external illuminance, an internal illuminance, or the like) through a vehicle network.

Hereinafter, the operation of the controller 60 will be described in detail with reference to FIG. 5, FIG. 6, FIG. 7, FIG. 8, and FIG. 9.

Figure 5:
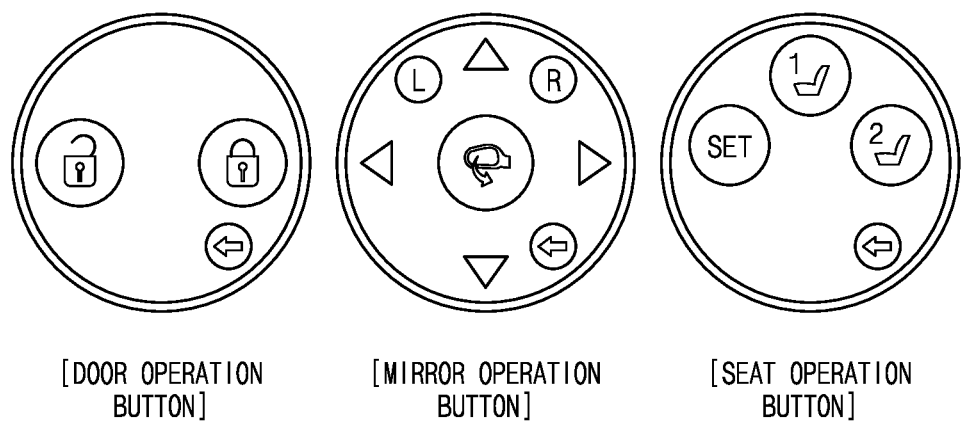
FIG. 5 is a first exemplary view showing an operation performed in a first operation mode by a controller provided in a mobile operation device according to various exemplary embodiments of the present invention.

FIG. 5 is a first exemplary view showing an operation performed in a first operation mode by a controller provided in a mobile operation device according to various exemplary embodiments of the present invention.

When the mobile operation device 200 is docked to the docking station 100 located in a door trim, the controller 60 may control the touch screen 30 to display a door operation button, a mirror operation button, a seat operation button as shown in FIG. 5.

When the door operation button is displayed on the touch screen 30, the controller 60 may interwork with a door-lock system directly or through the docking station 100 such that a function corresponding to the door operation button is operable. When the mirror operation button is displayed on the touch screen 30, the controller 60 may interwork with a mirror adjustment system directly or through the docking station 100 such that a function corresponding to the mirror operation button is operable. When the seat operation button is displayed on the touch screen 30, the controller 60 may interwork with an Integrated Memory System (IMS) directly or through the docking station 100 such that a function corresponding to the seat operation button is operable. For reference, the door lock system, the mirror adjustment system, and the IMS are systems provided in an autonomous vehicle, and detailed descriptions thereof will be omitted.

The controller 60 may determine priorities among a door mode, a mirror mode, and a seat mode based on state information related to the autonomous vehicle, which will be described in detail with reference to the following [Table 1] to [Table 3].

TABLE 1

| FROM | | TO | | | | | | | |
|---|---|---|---|---|---|---|---|---|---|
| | | PARKING 0 | DOOR OPEN 1 | DOOR CLOSE 2 | OFF 3 | ACC 4 | IGN 5 | STARTING 6 | DRIVE 7 |
| PARKING | 0 | 00 | 01 | 02→00 | 03→00 | 04 | X | 06 | X |
| DOOR OPEN | 1 | 10→11 | 11 | 12 | 13→11 | 14 | 15 | 16 | 17→11 |
| DOOR CLOSE | 2 | 20 | 21 | 22 | 23 | 24 | 25 | 26 | 27 |
| OFF | 3 | 30 | 31 | 32 | 33 | 34 | 35 | 36 | X |
| ACC | 4 | 40→44 | 41→44 | 42→44 | X | 44 | 45 | 46 | X |
| IGN | 5 | 50→55 | 51→55 | 52→55 | 53 | X | 55 | 56 | X |
| STARTING | 6 | 60→66 | 61→66 | 62→66 | 63 | 64 | X | 66 | 67 |
| DRIVE | 7 | X | 71 | 72→77 | 73 | 74 | X | 76 | 77 |

In [Table 1] above, "X" represents a situation that cannot occur. Each situation in [Table 1] is coded as shown in [Table 2] and [Table 3] below.

TABLE 2

| CODE | MODE | |
|---|---|---|
| 00 | Door Mode | |
| 01 | Door Mode | |
| 04 | Mirror Mode | Seat Mode |
| 06 | Mirror Mode | |
| 11 | Door Mode | |
| 12 | Door Mode | |
| 14 | Door Mode | |
| 15 | Door Mode | |
| 16 | Door Mode | |
| 20 | Door Mode | |
| 21 | Door Mode | |
| 22 | Door Mode | |
| 23 | Door Mode | |
| 24 | Mirror Mode | Seat Mode |
| 25 | Mirror Mode | Seat Mode |
| 26 | Mirror Mode | |
| 27 | Mirror Mode | |

TABLE 3

| CODE | MODE | |
|---|---|---|
| 30 | Door Mode | |
| 31 | Door Mode | |
| 33 | Door Mode | |
| 34 | Mirror Mode | Seat Mode |
| 35 | Mirror Mode | Seat Mode |
| 36 | Mirror Mode | |
| 44 | Mirror Mode | Seat Mode |
| 45 | Mirror Mode | Seat Mode |
| 46 | Mirror Mode | |
| 53 | Door Mode | |
| 55 | Mirror Mode | Seat Mode |
| 56 | Mirror Mode | |
| 63 | Door Mode | |
| 64 | Mirror Mode | Seat Mode |
| 66 | Mirror Mode | |
| 67 | Mirror Mode | |
| 71 | Door Mode | |
| 73 | Door Mode | |
| 74 | Mirror Mode | Seat Mode |
| 76 | Mirror Mode | |
| 77 | Mirror Mode | |

Figure 6:
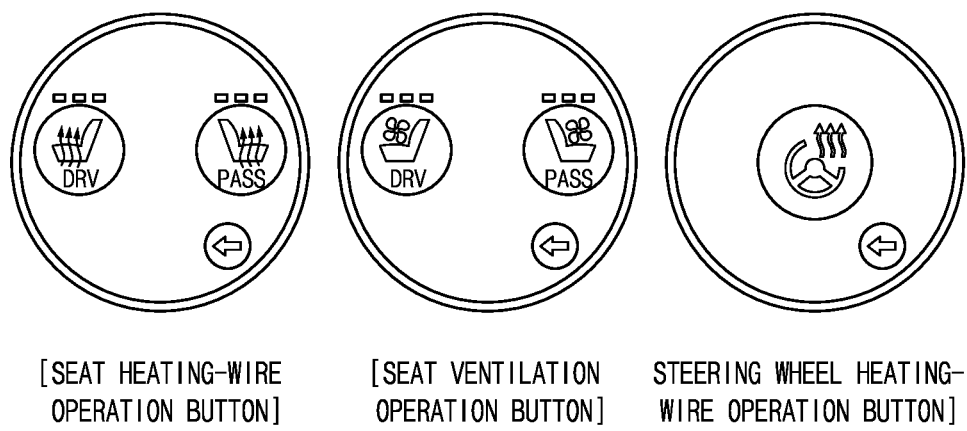
FIG. 6 is a second exemplary view showing an operation performed in a first operation mode by a controller provided in a mobile operation device according to various exemplary embodiments of the present invention.

FIG. 6 is a second exemplary view showing an operation performed in a first operation mode by a controller provided in a mobile operation device according to various exemplary embodiments of the present invention.

When the mobile operation device 200 is docked to the docking station 100 located in a console base, the controller 60 may control the touch screen 30 to display a seat heating-wire operation button, a seat ventilation operation button, and a steering wheel heating-wire operation button as shown in FIG. 6.

When the seat heating-wire operation button is displayed on the touch screen 30, the controller 60 may interwork with a seat heating system directly or through the docking station 100 such that a function corresponding to the seat heating-wire operation button is operable. When the seat ventilation operation button is displayed on the touch screen 30, the controller 60 may interwork with a seat ventilation system directly or through the docking station 100 such that a function corresponding to the seat ventilation operation button is operable. When the steering wheel heating-wire operation button is displayed on the touch screen 30, the controller 60 may interwork with a steering wheel heating system directly or through the docking station 100 such that a function corresponding to the steering wheel heating-wire operation button is operable. For reference, the seat heating system, the seat ventilation system, and the steering wheel heating system are systems generally provided in an autonomous vehicle, and detailed descriptions thereof will be omitted.

The controller 60 may determine an optimal mode among a seat heating mode, a seat ventilation mode, and a steering wheel heating mode based on the state information related to the autonomous vehicle. In the instant case, the state information is as shown in [Table 4] below.

On the other hand, the controller 60 may control the touch screen 30 to further display operation buttons shown in the following [Table 4].

TABLE 4

| Console base | Driving mode (COMFORT, SPORT, ECO) operation button |
|---|---|
| | Electronic Parking Brake (EPB) operation button |
| | AUTO HOLD operation button |
| | Parking distance warning operation button |
| | Surround View Monitoring System operation button |
| | Drive Video Record System (DVRS) operation button |
| | Rear curtain operation button |
| | Down hill brake control operation button |
| | ISG (Idle Stop & Go) operation button |
| | Four wheel drive switch button |

For example, the controller 60 may control the touch screen 30 to display a surround view monitoring system operation button when the autonomous vehicle is being parked.

Figure 7:
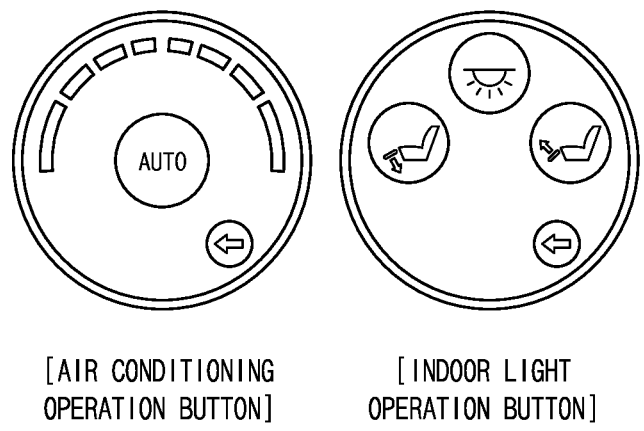
FIG. 7 is a third exemplary view showing an operation performed in a first operation mode by a controller provided in a mobile operation device according to various exemplary embodiments of the present invention.

FIG. 7 is a third exemplary view showing an operation performed in a first operation mode by a controller provided in a mobile operation device according to various exemplary embodiments of the present invention.

When the mobile operation device 200 is docked to the docking station 100 located in a rear seat, the controller 60 may control the touch screen 30 to display an air conditioning operation button and an indoor light operation button as shown in FIG. 7.

When the air conditioning operation button is displayed on the touch screen 30, the controller 60 may interwork with an air conditioning system directly or through the docking station 100 such that a function corresponding to the air conditioning operation button is operable. When the indoor light operation button is displayed on the touch screen 30, the controller 60 may interwork with an indoor light control system directly or through the docking station 100 such that a function corresponding to the indoor light operation button is operable. For reference, the air conditioning system and the indoor light control system are systems generally provided in an autonomous vehicle, and detailed descriptions thereof will be omitted.

The controller 60 may determine an optimal mode among an air conditioning mode and an indoor light mode based on state information related to the autonomous vehicle (e.g., outdoor temperature, indoor temperature, external illuminance, internal illuminance, or the like).

For example, the controller 60 may control the touch screen 30 to display the air conditioning operation button in a case in which a difference between the outdoor temperature and the indoor temperature is greater than a reference value, and control the touch screen 30 to display the indoor light operation button when the internal illuminance is not greater than a reference value in a case in which the difference between the outdoor temperature and the indoor temperature is less than or equal to the reference value.

Figure 8A:
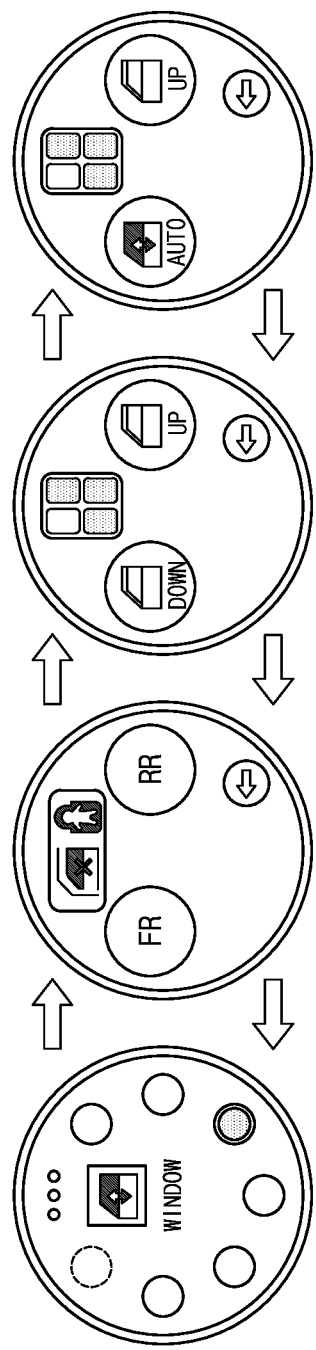
FIG. 8A, FIG. 8B, and FIG. 8C are exemplary views showing an operation performed in a second operation mode by a controller provided in a mobile operation device according to various exemplary embodiments of the present invention.
Figure 8B:
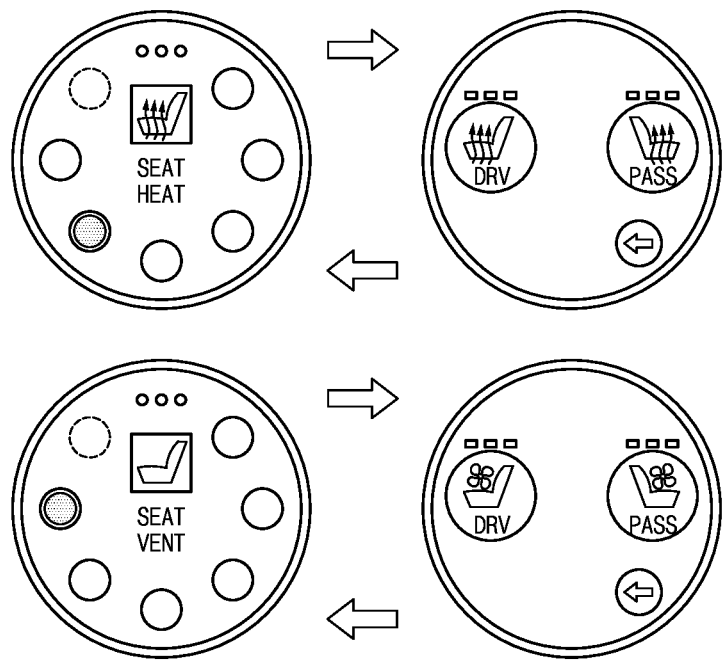
Figure 8C:
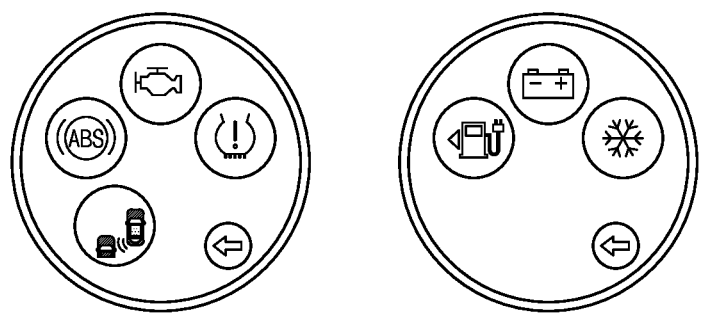

FIG. 8A, FIG. 8B, and FIG. 8C are exemplary views showing an operation performed in a second operation mode by a controller provided in a mobile operation device according to various exemplary embodiments of the present invention.

When the mobile operation device 200 is in the inside of the autonomous vehicle while not being docked to any docking station 100 in the autonomous vehicle, the controller 60 may control a window operation button as shown in FIG. 8A, a seat operation button as shown in FIG. 8B, and a touch screen 30 to display a variety of vehicle state notification information as shown in FIG. 8C.

When the window operation button is displayed on the touch screen 30, the controller 60 may interwork with a power window system directly or through the docking station 100 such that a function corresponding to the window operation button is operable. When the seat operation button is displayed on the touch screen 30, the controller 60 may interwork with a seat heating-wire system directly or through the docking station 100 such that a function corresponding to the seat operation button is operable.

The controller 60 may obtain vehicle state notification information from various electronic control units (ECUs) in the autonomous vehicle to display vehicle state notification information on the touch screen 30.

The controller 60 may determine the optimal mode among window operation mode, seat operation mode, and notification mode based on the state information related to the autonomous vehicle (for example, outside temperature, indoor temperature, external illumination, internal illumination, vehicle speed, safety information, etc.).

Figure 9:
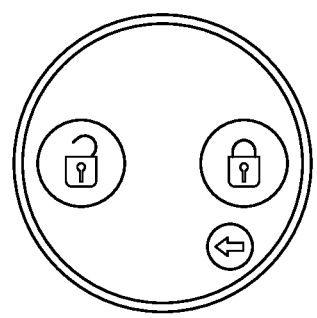
FIG. 9 is a third exemplary view showing an operation performed in a third operation mode by a controller provided in a mobile operation device according to various exemplary embodiments of the present invention.

FIG. 9 is a third exemplary view showing an operation performed in a third operation mode by a controller provided in a mobile operation device according to various exemplary embodiments of the present invention.

When the mobile operation device 200 is in the outside of the autonomous vehicle while not being docked to any docking station 100 in the autonomous vehicle, the controller 60 may allow the touch screen 30 to display a door operation button as shown in FIG. 9. In the instant case, the mobile operation device 200 may function as a smart key.

When the door operation button is displayed on the touch screen 30, the controller 60 may interwork with a door lock system directly or through the docking station 100 such that a function corresponding to the door operation button is operable.

Figure 10:
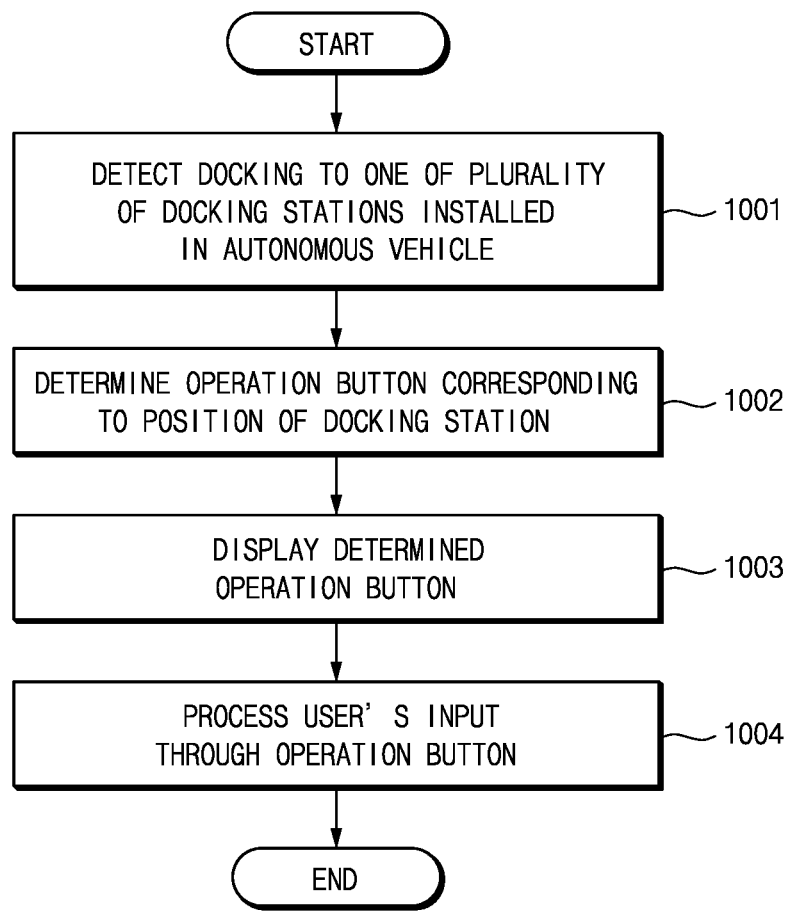
FIG. 10 is a flowchart of an operating method of a mobile operation device provided in a multifunctional switch system for an autonomous vehicle according to various exemplary embodiments of the present invention.

FIG. 10 is a flowchart of an operating method of a mobile operation device provided in a multifunctional switch system for an autonomous vehicle according to various exemplary embodiments of the present invention.

First, the controller 60 may detect a docking to any one of a plurality of docking stations provided in the interior of an autonomous vehicle (1001). In the instant case, the docking station 100 may detect a strength of the magnetic force of the magnet 10 provided in the mobile operation device 200, and when the strength of the magnetic force is detected, may transmit identification information related to the docking station 100 itself to the mobile operation device 200. Accordingly, when the mobile operation device 200 receives the identification information related to the docking station 100, the mobile operation device 200 may determine that the mobile operation device 200 is docked to the docking station 100, and determine an operation button based on the identification information. In an exemplary embodiment of the present invention, when the strength of the detected magnetic force is greater than a predetermined strength, the docking station 100 may transmit identification information related to the docking station 100 itself to the mobile operation device 200.

Thereafter, the controller 60 may determine an operation button corresponding to the position of the docking station 100 (1002).

Thereafter, the touch screen 30 may display the determined operation button (1003).

Accordingly, the controller 60 may process a user's input through the operation button (1004).

Figure 11:
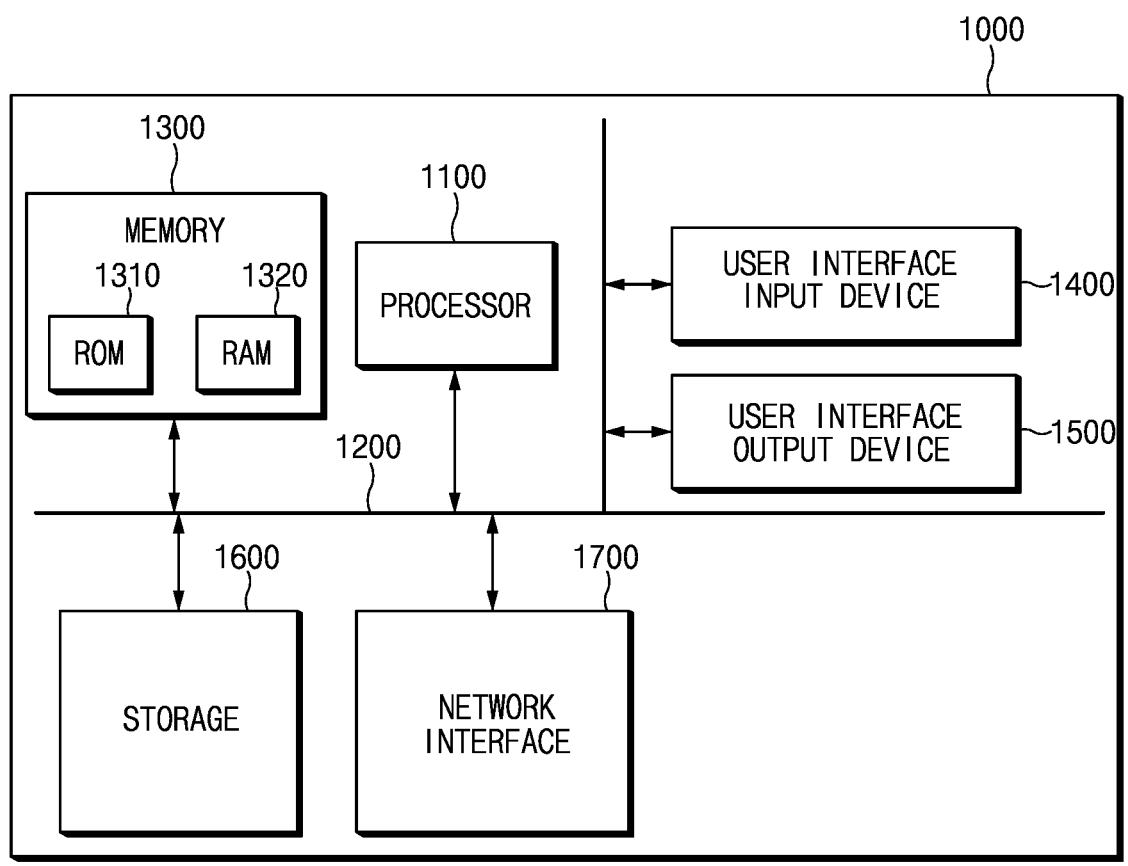
FIG. 11 is a block diagram showing a determining system for performing an operating method of a mobile operation device provided in a multifunctional switch system for an autonomous vehicle according to various exemplary embodiments of the present invention.

FIG. 11 is a block diagram illustrating a determining system for performing an operating method of a mobile operation device provided in a multifunctional switch system for an autonomous vehicle according to various exemplary embodiments of the present invention.

Referring to FIG. 6, the operating method of the mobile operation device provided in a multifunctional switch system for an autonomous vehicle according to various exemplary embodiments of the present invention as described above may be also implemented through a computing system. A computing system 1000 may include at least one processor 1100, a memory 1300, a user interface input device 1400, a user interface output device 1500, storage 1600, and a network interface 1700, which are connected to each other via a system bus 1200.

The processor 1100 may be a central processing unit (CPU) or a semiconductor device that processes instructions stored in the memory 1300 or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 or the storage 1600) such as a RAM, a flash memory, a ROM, an EPROM, an EEPROM, a register, a hard disk, a solid state drive (SSD), a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present invention, and various modifications and variations may be made without departing from the essential characteristics of the present invention by those skilled in the art to which various exemplary embodiments of the present invention pertains.

Therefore, the exemplary embodiments of the present invention are provided to explain the spirit and scope of the present invention, but not to limit them, so that the spirit and scope of the present invention is not limited by the embodiments. The scope of protection of the present invention may be interpreted by the following claims, and all technical ideas within the scope equivalent thereto may be construed as being included in the scope of the present invention.

The multifunctional switch system for an autonomous vehicle and the operating method thereof include a plurality of docking stations in the interior of the autonomous vehicle, set an operation mode of a mobile operation device configured for each of positions of the plurality of docking stations, and operate in an operation mode corresponding to the position of the docking station as the mobile operation device is docked to the docking station to enable a driver in the autonomous vehicle to conveniently operate various convenience devices regardless of the driver's location.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A mobile operation device for a vehicle, the mobile operation device comprising:
    a magnetic force generator configured to generate a magnetic force for docking to a plurality of docking stations provided in an interior of the vehicle;
    a touch screen configured to display a plurality of operation buttons; and
    a controller configured to control the touch screen to display an operation button corresponding to a position of a docking station among the plurality of operation buttons when the mobile operation device is docked to one of the plurality of docking stations, and process a user's input through the displayed operation button.

2. The mobile operation device of claim 1, wherein the controller is configured to control the touch screen to display at least one of a door operation button, a mirror operation button, and a seat operation button among the plurality of operation buttons when the mobile operation device is docked to a docking station provided in a door trim in the vehicle.

3. The mobile operation device of claim 2, wherein the controller is configured to determine priorities among the door operation button, the mirror operation button and the seat operation button according to state information related to the vehicle.

4. The mobile operation device of claim 1, wherein the controller is configured to control the touch screen to display one of a seat heating-wire operation button, a seat ventilation operation button, and a steering wheel heating-wire operation button according to state information related to the vehicle among the plurality of operation buttons when the mobile operation device is docked to a docking station provided in a console base in the vehicle among the plurality of docking stations.

5. The mobile operation device of claim 4, wherein the controller is configured to select the seat heating-wire operation button when an outdoor temperature is less than a first reference value, and select the seat ventilation operation button when the outdoor temperature is greater than a second reference value which is greater than the first reference value.

6. The mobile operation device of claim 1, wherein the controller is configured to control the touch screen to display one of an air conditioning operation button and an indoor light operation button according to state information related to the vehicle among the plurality of operation buttons when the mobile operation device is docked to a docking station provided in a rear seat in the vehicle among the plurality of docking stations.

7. The mobile operation device of claim 6, wherein the controller is configured to select the air conditioning operation button when a difference between an outdoor temperature and an indoor temperature of the vehicle is greater than a reference value.

8. The mobile operation device of claim 1, wherein the controller is configured to control the touch screen to display one of a window operation button and a seat operation button among the plurality of operation buttons, and vehicle state notification information according to state information related to the vehicle when the mobile operation device is inside the vehicle while not being docked to any of the plurality of docking stations.

9. The mobile operation device of claim 1, wherein the controller is configured to control the touch screen to display a door operation button when the mobile operation device is outside the vehicle among the plurality of operation buttons while not being docked to any of the plurality of docking stations.

10. An operating method of a mobile operation device for a vehicle, the method comprising:
    detecting, by a controller, a docking to a docking station among a plurality of docking stations provided in an interior of the vehicle;
    determining, by the controller, an operation button corresponding to the docking station;
    displaying, by a touch screen, the determined operation button; and
    processing, by the controller, an input of a user through the determined operation button.

11. The method of claim 10, wherein the determining of the operation button includes selecting at least one of a door operation button, a mirror operation button, and a seat operation button when being docked to a docking station provided in a door trim in the vehicle among the plurality of docking stations.

12. The method of claim 11, wherein the selecting of at least one of the door operation button, the mirror operation button, and the seat operation button includes determining priorities among the door operation button, the mirror operation button and the seat operation button according to state information related to the vehicle.

13. The method of claim 10, wherein the determining of the operation button includes selecting one of a seat heating-wire operation button, a seat ventilation operation button, and a steering wheel heating-wire operation button according to state information related to the vehicle when being docked to a docking station provided in a console base in the vehicle among the plurality of docking stations.

14. The method of claim 13, wherein the selecting of one of the seat heating-wire operation button, the seat ventilation operation button, and the steering wheel heating-wire operation button includes:

selecting the seat heating-wire operation button when an outdoor temperature is less than a first reference value; and selecting the seat ventilation operation button when the outdoor temperature is greater than a second reference value which is greater than the first reference value.

15. The method of claim 10, wherein the determining of the operation button includes selecting one one of an air conditioning operation button and an indoor light operation button according to state information related to the vehicle when being docked to a docking station provided in a rear seat in the vehicle among the plurality of docking stations.

16. The method of claim 15, wherein the selecting of one of the air conditioning operation button and the indoor light operation button includes selecting the air conditioning operation button when a difference between an outdoor temperature and an indoor temperature of the vehicle is greater than a reference value.

17. The method of claim 10, wherein the determining of the operation button includes selecting one of a window operation button, a seat operation button, and vehicle state notification information according to state information related to the vehicle when the mobile operation device is inside the vehicle while not being docked to any of the plurality of docking stations.

18. The method of claim 10, wherein the determining of the operation button includes selecting a door operation button when the mobile operation device is outside the vehicle while not being docked to any of the plurality of docking stations.

19. A multifunctional switch system for a vehicle, the multifunctional switch system comprising:

a plurality of docking stations provided in an interior of the vehicle to communicate with a plurality of convenience devices provided in the vehicle; and a mobile operation device configured to make a docking to a docking station among the plurality of docking stations through a magnetic force, determine an operation button corresponding to a position of the docking station, display the determined operation button and process a user's input through the displayed operation button.

20. The multifunctional switch system of claim 19, wherein the docking station guides the user to a docking zone by turning on a lamp when a strength of the magnetic force of the mobile operation device is greater than a reference value.

* * * * *